United States Patent [19]

Kroetsch

[11] Patent Number: 4,523,063
[45] Date of Patent: Jun. 11, 1985

[54] TOUCH PROBE HAVING NONCONDUCTIVE CONTACT CARRIERS

[75] Inventor: Charles F. Kroetsch, Warren, Mich.

[73] Assignee: GTE Valeron Corporation, Troy, Mich.

[21] Appl. No.: 557,754

[22] Filed: Dec. 5, 1983

[51] Int. Cl.³ .......................... H01H 3/00; G01B 5/00
[52] U.S. Cl. .................................... 200/61.41; 33/561
[58] Field of Search .................... 200/61.41–61.44, 200/61.45 R, 61.52; 33/174 L

[56] References Cited

U.S. PATENT DOCUMENTS

| 4,138,823 | 2/1979 | McMurtry | 33/174 |
| 4,153,998 | 5/1979 | McMurtry | 33/174 |
| 4,159,429 | 6/1979 | Migliardi et al. | 200/61.41 |
| 4,168,413 | 9/1979 | Halpine | 200/61.41 X |
| 4,288,925 | 9/1981 | McMurtry | 33/174 |
| 4,301,338 | 11/1981 | McMurtry | 200/61.41 |
| 4,328,623 | 5/1982 | Juengel | 33/174 |
| 4,397,093 | 8/1983 | McMurtry | 33/174 |
| 4,401,945 | 8/1983 | Juengel | 324/207 |
| 4,451,987 | 6/1984 | Cusack | 33/174 |

Primary Examiner—G. P. Tolin
Attorney, Agent, or Firm—Harness, Dickey & Pierce

[57] ABSTRACT

A probe for detecting contact with an object such as a workpiece includes a movable carrier having a first set of contacts mounted thereto and a fixed carrier having a second set of contacts mounted thereon. The first carrier is operable connected to a probe stylus and moves therewith when the probe stylus contacts an object thereby making or breaking electrical connection between one or more of the contacts. Each of the carrier members is made of a body of high flexural strength nonconductive material, preferably glass fiber reinforced plastic, to thereby simplify electrical insulation of the contacts as well as to insure repeatability of the probe measurements.

15 Claims, 5 Drawing Figures

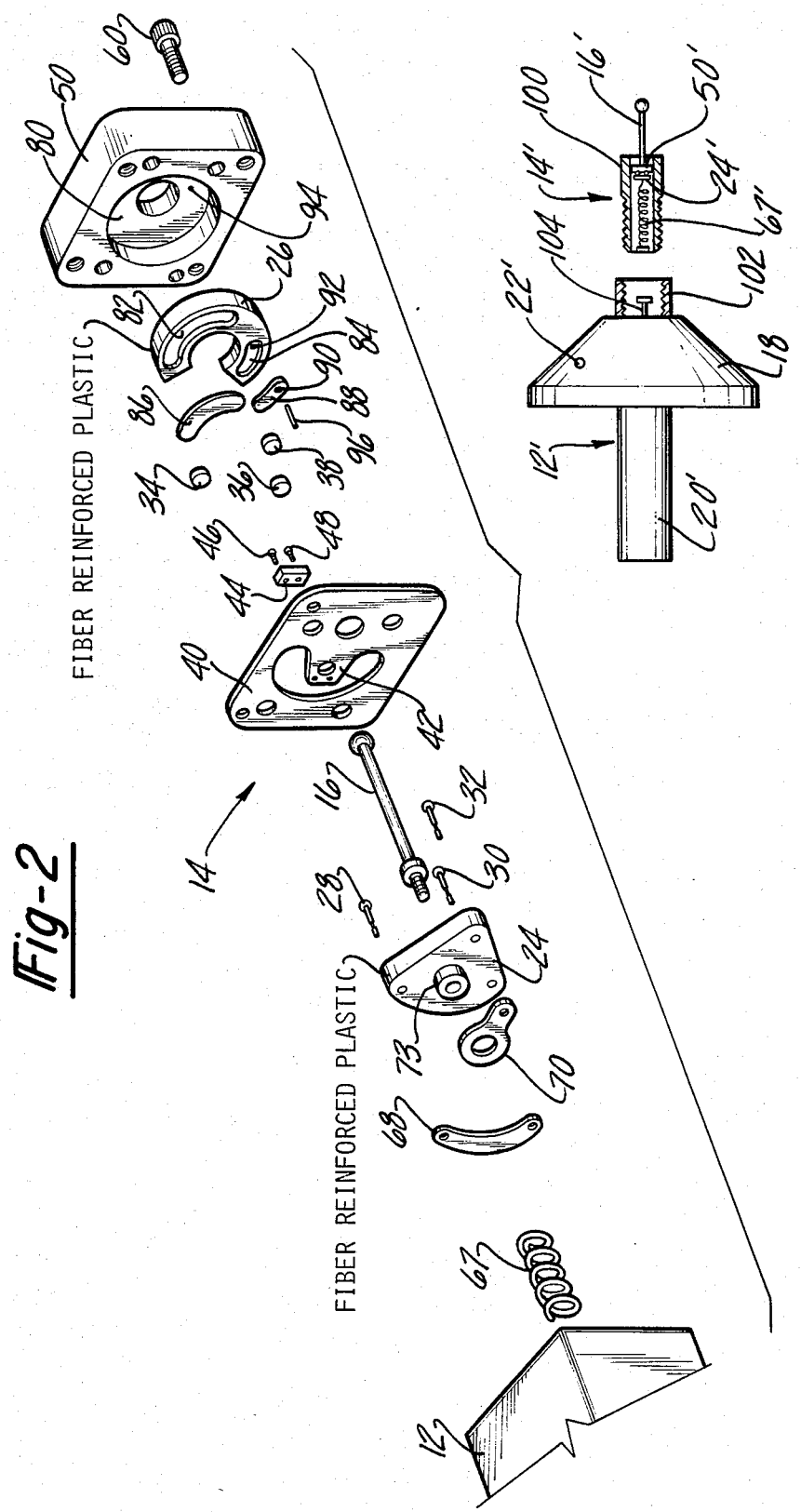

TOUCH PROBE HAVING NONCONDUCTIVE CONTACT CARRIERS

DESCRIPTION

1. Technical Field

This invention relates to probes for detecting contact with an object such as a workpiece. More particularly, the invention involves techniques for simplifying the construction of such probes while at the same time insuring repeatable measurements from such probes.

2. Background

Automated machining systems and coordinate measurements systems require a precise means for locating surfaces on workpieces. One method of perforing such measurement is to utilize a so-called "touch probe" in which a stylus is moved into a position where it touches the surface resulting in a movement of the stylus from its rest position. The probe includes two carrier members, one fixed and one movable with the stylus, with each carrier member having one or more electrically conductive contacts mounted thereto and opposing contacts mounted on the other carrier member. When the stylus moves from its rest position the electrical characteristics between opposing contacts change. This change in electrical characteristic is typically made by opening the contacts and detecting the resultant change in electrical resistance by suitable electrical circuitry which transmits a signal to the machine controller. The signal from the probe is used in conjunction with a determination of the X, Y and Z axes location of the table or machine spindle to calculate the position of the inspected workpiece surface.

Touch probes manufactured by the assignee of the present invention have utilized a set of spherical contacts mounted to a movable carrier member in the form of a pivot plate connected to the stylus. These spherical contacts oppose a second set of contacts presenting flat opposing surfaces, such contacts being mounted to a fixed member. (See, e.g., U.S. Ser. No. 388,187, filed June 14, 1982 by Cusack, entitled "Touch Probe", now U.S. Pat. No. 4,451,987.) Other types of touch probes utilize first contacts in the form of radially outwardly extending pins which are trapped by two converging spherical surfaces provided by way of fixed ball bearings (See, e.g. U.S. Pat. No. 4,153,998 to McMurtry; U.S. Pat. No. 4,288,925 to McMurtry; U.S. Pat. No. 4,138,832 to McMurtry and U.S. Pat. No. 4,397,093 to McMurtry).

The usefulness of these touch probes depends upon their capability of performing accurate repeatable measurements. It is often desirable to provide a probe that is capable of repeating its measurement to within about one micron or less. In other words, if the probe is used to make several measurements on the same workpiece surface, the calculated position thereof cannot deviate more than about one micron.

In probes of this type it becomes necessary to insulate the contacts from other electrically conductive material in the probe. Several different insulation techniques have been employed and some are discussed in the patent literature identified above. For example, the '823 patent noted above employs components made of synthetic resin to which the contacts are mounted. However, in order to provide the precision repeatability properties demanded of a commercially acceptable probe, most of the probes that are actually sold and used employ metal bodies as carriers for the contacts. While these metal carriers have good flexural strength, they do present problems in electrically insulating the contacts due to their conductive properties. One commonly used practice is to use anodized aluminum as the carrier members (the anodized layer being nonconductive) and to mount the contacts onto the anodized surface by way of epoxy. Unfortunately, the anodization is susceptable to being scratched or permeated by the epoxy thereby impairing the insulation properties thereof which can lead to improper probe operation.

Those skilled in the art appreciate that the manufacture and assembly of probes of this type can be a difficult task. Electrical connections must be made to the contacts and with the advent of relatively small probe constructions this can present problems which are not easily overcome. The entire probe must be constructed in such a manner that it is rugged and can be used over extended periods of time while also insuring that the accuracy of the probe measurement is not sacrificed. Thus, it is highly desirable to provide a probe construction that can be more easily manufactured while still achieving these high standards.

SUMMARY OF THE INVENTION

In the preferred embodiment disclosed herein, the carrier members for the contacts are made of nonconductive material having a high flexural strength. Preferably, the carrier members are constructed of fiber reinforced plastic, with the fiber content being in the range of 7.5–40% by volume. The high flexural strength of these plastic carriers provides the probe with excellent performance while at the same time greatly simplifying the probe construction especially as it relates to insulation of the contacts.

The overall probe construction employing nonconductive contact carriers is another feature of this invention. One of the carriers takes the form of a pivot plate to which a first set of contacts are inserted. The second carrier is in the form of an insert which is supported on a rigid metal plate of the probe. A second set of contacts are located on the second carrier and oppose the first set when the probe stylus is in its rest position. The contacts are arranged as a plurality of serially connected switches, the opening of which can be detected by suitable circuitry. Electrical connection to the switching assembly is accomplished in a simple but reliable manner. A first electrically conductive path is established between the detection circuitry and one of the contacts on the pivot plate. One of the contacts of the second set is electrically connected to the metallic plate which cooperates with the probe housing to form a ground plane thereby completing the electrical connection to the detection circuitry which can be grounded through the probe housing.

BRIEF DESCRIPTION OF THE DRAWINGS

The various advantages of the present invention will become apparent to one skilled in the art upon reading the following specification and by reference to the drawings in which:

FIG. 2 is an exploded perspective view of the switch assembly of the preferred embodiment of this invention;

FIG. 5 is a simplified cross-sectional view showing an alternative construction for connecting the switch assembly to a main probe housing.

DESCRIPTION OF THE PREFERRED EMBODIMENTS

Figure 1:
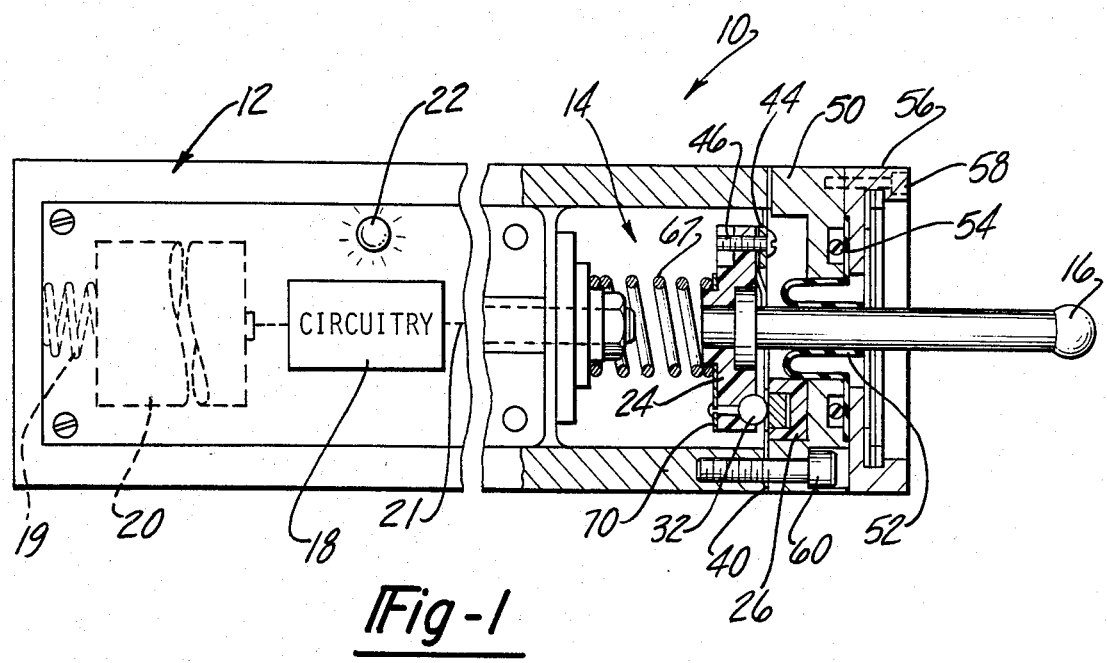
FIG. 1 is a fragmentary top view of a probe constructed in accordance with the teachings of the present invention.

In FIG. 1, the techniques of the present invention are shown in connection with a probe 10 whose main housing 12 is particularly designed to be inserted into slots or the like in a turning center such as a lathe. However, it should be understood that the concepts of the instant invention may be employed in a variety of different probe housing configurations, for example, such as those adapted to be inserted into the spindle of machining centers. In such case, the probe housing may take other shapes and is generally provided with an adapter for insertion into the spindle. The instant invention is more directed towards the switch assembly generally designated by the numeral 14. The switch assembly 14 is sometimes referred to as the probe head and may, in some instances, take the form of a separable unit which may be attached to various probe housings as will be described later herein in connection with FIG. 5.

Probe 10 includes a stylus 16 which is adapted to come into contact with an object such as a workpiece surface. When the stylus 16 is contacted, it is moved from its rest position thereby resulting in a change in electrical characteristics of the switch assembly 14 which will be described in more detail later herein. This change in electrical characteristics is detected by suitable electronic circuitry such as circuitry 18 which is contained in the main probe housing. Circuitry 18 is connected to a power source which, in this embodiment, takes the form of a battery 20. Upon detection of the stylus contact, circuitry 18 operates to transmit a signal to the machine controller (not shown) to thereby indicate that the stylus 16 has contacted the workpiece surface under investigation. The signal may be transmitted by various means but one particularly advantageous form is to generate and transmit an infrared signal via LED 22 to a remote receiver. Suitable transmission schemes are described in more detail in U.S. Pat. No. 4,328,623; U.S. Pat. No. 4,401,945, U.S. Pat. No. 478,906 by Juengel, filed Mar. 25, 1983 entitled "Apparatus for Detecting The Position of a Probe Relative to a Workpiece;" and co-pending U.S. Ser. No. 501,994, filed June 14, 1983, entitled "Turning Tool Probe", each of which are assigned to the assignee of the present invention. These patent and applications are hereby incorporated by reference. However, a wide variety of other transmission schemes are within the scope of the instant invention.

Special attention should now be given to the construction of the switch assembly 14. An important aspect of this invention is that the contact carriers 24 and 26 are made of high flexural strength nonconductive material. Carrier member 24 is coupled to probe stylus 16 and is movable therewith; carrier 26 is fixed. In this embodiment, carrier 24 takes the form of a triangularly shaped pivot plate having three equally spaced contacts in the form of ball pins 28, 30 and 32 mounted thereto in the manner to be described. Opposing this first set of contacts is a second set of fixed contacts taking the form of the discs 34, 36 and 38 mounted to carrier 26.

When the stylus 16 is in its rest position the balls 28-30 are urged against their respective discs 34-38. Each of the three ball-disc pairs comprise a switch and these three switches are electrically connected together in series as will be described. The contacts are held in alignment by way of a reed spring 40 having a tab 42 connected to pivot plate carrier 24 via retainer block 44 and screws 46, 48. The periphery of reed spring 40 is sandwiched between housing 12 and a metallic support plate 50. The switch assembly 14 is protected from adverse environmental conditions by way of a diaphragm 52 nd O-ring 54 which are held in place by an outer plate 56. Outer plate 56 is attached to support plate 50 by way of screws 58, support plate 50 being similarly connected to the metallic main probe body 12 by way of screws 60.

When stylus 16 contacts an object, it is displaced from its rest position thereby tilting pivot plate carrier 24 and lifting at least one of the ball contacts 28-32 from its respective disc contact 34-38. This procedure opens one of the ball-disc switches and is sensed by circuitry 18 causing it to transmit a signal via LED 22.

It can be appreciated that probe constructions of this general type necessitate that the electrically conductive contacts be electrically insulated from other conductive probe components. In addition, it is imperative that the carriers for the contacts have very high flexural strength with minimal yielding properties in order to insure proper probe operation. The carriers should exhibit flexural strengths preferably exceeding 20,000 psi (120 newtons/mm$^2$). It has been discovered that by making the carriers 24 and 26 out of fiber reinforced plastic that both of these constraints can be met.

Carriers 24 and 26, in this embodiment, are injection molded parts comprising glass fiber reinforced plastic resin bodies. The ratio of fibers to resin should be high enough to provide the required flexural strength while not being so high as to cause the part to become brittle or cause problems in the molding process. The glass fiber content should be 7.5-40% by volume, with a fiber content of about 30% by volume being presently preferred.

Various types of resins may be utilized but poly(butyleneterepthalate) known as PBT has provided excellent results. One commercially available reinforced plastic resin meeting the above constraints is the 400 family of Valox resins, preferably Valox-420, available from General Electric Company.

Figure 4:
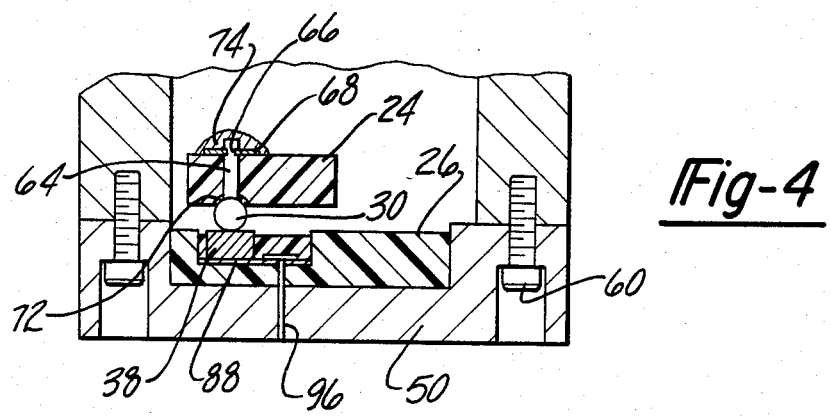
FIG. 4 is a cross-sectional view taken along the lines 4—4 of FIG. 3.
Figure 3:
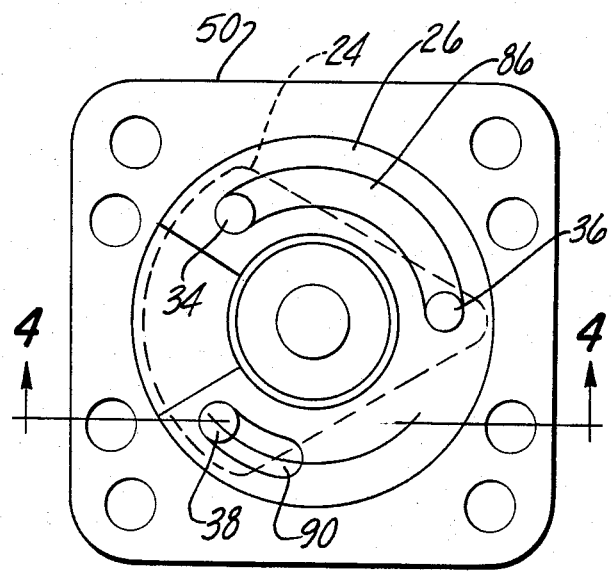
FIG. 3 is a simplified end view of the assembled switch assembly as viewed looking towards the right in FIG. 2.

Special attention should now be focused on the method by which the contacts are mounted and the way in which electrical connection is made thereto. The contacts 28-32 consist of tungsten carbide balls brazed to beryllium copper shanks 64. As can be seen most clearly in FIG. 4, the shanks are inserted through holes formed in pivot plate carrier 24. The end of shank 64 includes a circumferential groove 66. An arcuate shaped conductive foil 68 includes openings at each end that are snap fit over the grooves 66 in the shanks of contacts 28-30 to provide electrical connection therebetween. A second foil 70 (see FIG. 2) surrounds a neck 73 on carrier 24 and is similarly snap fit over the end of the shank of contact 32. The contacts are firmly held in place by way of conductive epoxy 72 and 74 on both sides of the carriers 24 as can be seen most clearly in FIG. 4. A coil spring 67 engages foil 70 and serves the dual purpose of urging pivot plate carrier 24 towards fixed carrier 26 and to make electrical connection between circuitry 18 in the probe housing 12 and the switch assembly 14.

Turning now to the fixed carrier 26, it takes the form of a C-shaped annulus which fits within and is supported by a well 80 formed within support plate 50. The outer surface of carrier 26 includes two arcuate slots 82 and 84 formed therein. Slot 82 is larger and is designed to contain both the discs 34 and 36 at its outer ends. A conductive foil 86 lies within slot 82 and the discs 34 and 36 are placed thereon. The recessed areas between discs 34 and 36 is filled with conductive epoxy to hold the discs in place.

A foil 88 lies within the smaller slot 84. One end of foil 88 includes an opening 90 which becomes aligned with openings 92 and 94 in carrier 26 and support plate 50, respectively. A conductive pin 96 passes through openings 90-94 with the head of pin 96 being in contact with foil 88 and the shank of pin 96 being in electrical contact with plate 50. This is shown most clearly again in FIG. 4. Disc 38 is disposed on the other end of foil 88 and conductive epoxy 98 holds the subassembly in place.

The construction noted above simplifies the electrical connection to the plurality of ball-disc switches in a manner which insures good electrical integrity. The electrical connection is best explained in connection with FIGS. 1 and 2. The negative side of battery 20 is connected to the metallic probe housing 12 via a conventional spring clip 19. The positive battery terminal is connected to circuitry 18. Circuitry 18 in probe housing 12 is connected by way of a wire, cable, or the like (represented by the line 21 in FIG. 1) to coil spring 67 of the switch assembly 14. The opposite end of coil spring 67 contacts foil 70 connected to ball contact 32. Ball contact 32 rests on disc 36 thereby forming the first switch. Disc 36 is electrically connected by way of foil 86 to disc 34. Disk 34 opposes ball contact 28 thereby forming the second switch. The shank of ball contact 28 is connected by way of foil 68 to the shank of ball contact 30. Ball contact 30 opposes disc 38 thereby forming the third switch, each of the switches being electrically connected in series. Disc 38 is connected to the metallic support plate 50 by way of foil 88 and pin 96. Since plate 50 is metallic and is physically connected to the metallic probe housing 12, it forms a ground plane completing the electrical loop back to the battery 20 and circuitry 18 in the probe housing.

FIG. 5 illustrates a presently preferred probe construction which employs a separable head 100 containing the switch assembly. This construction uses the same basic components as described above and these like components will be referred to by the same reference numerals with primed superscripts added. The main probe housing 12' is metallic and is designed to have the batteries 20', circuitry 18' and one or more LED's 22' mounted in the general locations shown. One end of housing 12' includes an internally threaded annular ferrule 102 having suitable electrical connector means 104 therein coupled to circuitry 18'.

Head 100 is metallic and includes threads on one end which allow the head to be screwed into ferrule 102. Means 104 thus makes electrical connection with coil 67' and the connection is made to the three ball/disc switches as described above. The support plate 50' is connected to the metallic head housing which completes the ground circuit back through ferrule 102 in the main probe housing 12'. The use of the separable head 100 permits the same switch assembly construction to be used with a variety of different probe housings, each housing being particularly adapted to fit a given machine. For example, the elongated circular battery compartment 12' of the construction of FIG. 5 is designed to fit within holders for boring bars whereas the rectangular cross section of the housing 12 of FIG. 1 is primarily used in slots in turrets.

Regardless of the type or probe housing or signal transmission scheme employed, the construction of the switch assembly as defined by the following claims provides the probe with excellent measurement characteristics while also simplifying its construction.

I claim:

1. In a probe with a stylus for detecting contact with an object, the probe having a switch assembly including a first carrier member transversely connected to the stylus and having a first set of electrically conductive contacts affixed thereto, a second carrier member having a second set of electrically conductive contacts affixed thereto, and whereby electrical characteristics between the two sets of contacts are changed when the stylus contacts an object, wherein the improvement comprises:
   at least one of said carrier members being constructed of a body of electrically nonconductive fiber reinforced plastic thereby simplifying electrical insulation of the contacts affixed thereto while insuring repeatable accurate measurements of the probe.

2. The improvement of claim 1 wherein said body is constructed of glass fiber reinforced plastic resin containing 7.5-40% by volume glass fibers.

3. The improvement of claim 2 wherein said plastic resin is poly(butyleneterephthalate).

4. The improvement of claim 1 wherein said first carrier member comprises a fiber reinforced plastic pivot plate connected to the stylus, and wherein said second carrier member comprises a fiber reinforced plastic insert supported on a fixed metallic plate.

5. The improvement of claim 4 wherein each of the contacts of said first set includes an elongated shank terminating at one end in a spherical-shaped configuration and having a groove located at an opposite end of the shank; and wherein electrical connection between two of the contacts of the first set is made by way of a foil press fit onto the grooves of the shanks of two of the contacts.

6. The improvement of claim 5 wherein said insert includes at least one arcuate-shaped slot formed in a surface thereof, and wherein contacts of the second set comprise discs, with two of the discs being mounted in said slot.

7. The improvement of claim 6 wherein a third disc contact of the second set is located in a second slot formed in the insert, and wherein said second slot includes means for electrically connecting the third disc to the metallic plate.

8. The improvement of claim 7 wherein said means comprises a second foil lying in said second slot, and an electrically conductive pin coupled at one end to the foil and having a shank portion passing through the insert into the metallic plate.

9. In a probe for detecting contact with an object, the improvement comprising:
   a pivot plate constructed of fiber reinforced plastic, a plurality of first ball contacts each having a shank terminating in a ball at one end which is located on one side of the pivot plate, with the shank passing through the pivot plate and having an opposite end located on the other side of the pivot plate, first means for electrically connecting together said opposite shank ends of two of the first contacts;

a stylus connected to the pivot plate;

a fixed metallic support member;

an insert constructed of fiber reinforced plastic supported by the support member, said insert including a plurality of second disc contacts thereon each presenting flat surfaces for opposing the balls on the pivot plate when the stylus is in a rest position, second means for electrically connecting one of the second contacts to the metallic support member; and third means, including said first and second means, for electrically connecting each pair of ball/disc contacts into a series circuit whereby displacement of the stylus from its rest position results in a change in electrical characteristic between at least one ball/disc pair.

10. The improvement of claim 9 wherein said first means comprises a foil press fit onto the ends of the shanks of two of the first contacts.

11. The improvement of claim 9 wherein said insert includes a first slot formed in a surface thereof, with two of the discs being located within the slot and electrically connected together by fourth means lying in the slot.

12. The improvement of claim 11 wherein said fourth means comprises a foil lying in the slot upon which the discs rest.

13. The improvement of claim 12 wherein said insert includes a second slot formed therein, with a third disc being located in the second slot, and wherein said second means comprises a pin passing through the insert, said pin having one end electrically connected to the third disc and its opposite end contacting the metallic support member.

14. The improvement of claim 13 wherein said second slot in the insert further includes a third foil on which the third disc rests and which is electrically connected to said pin.

15. The improvement of claim 14 wherein said first and second slots in the insert are filled with conductive epoxy.

* * * * *